US011337165B2

(12) United States Patent
Liu et al.

(10) Patent No.: US 11,337,165 B2
(45) Date of Patent: May 17, 2022

(54) METHODS AND APPARATUSES FOR POWER CONTROL FOR IN-DEVICE COEXISTENCE

(71) Applicant: Telefonaktiebolaget LM Ericsson (publ), Stockholm (SE)

(72) Inventors: Chunhui Liu, Beijing (CN); Huaisong Zhu, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/040,607

(22) PCT Filed: Mar. 23, 2018

(86) PCT No.: PCT/CN2018/080306
§ 371 (c)(1),
(2) Date: Sep. 23, 2020

(87) PCT Pub. No.: WO2019/178864
PCT Pub. Date: Sep. 26, 2019

(65) Prior Publication Data
US 2021/0120503 A1    Apr. 22, 2021

(51) Int. Cl.
*H04W 52/26* (2009.01)
*H04W 24/08* (2009.01)
(Continued)

(52) U.S. Cl.
CPC ......... *H04W 52/265* (2013.01); *H04W 24/08* (2013.01); *H04W 52/243* (2013.01); *H04W 52/36* (2013.01); *H04W 88/06* (2013.01)

(58) Field of Classification Search
CPC . H04W 52/265; H04W 52/243; H04W 52/36; H04W 24/08; H04W 24/10; H04W 88/06; H04W 72/1215; H04W 72/082
See application file for complete search history.

(56) References Cited

U.S. PATENT DOCUMENTS 8,737,924 B2    5/2014 Fu et al.
8,934,362 B2    1/2015 Hsu et al.
(Continued)

OTHER PUBLICATIONS

Author Unknown, "Technical Specification Group Radio Access Network; Evolved Universal Terrestrial Radio Access (E-UTRA); Study on signalling and procedure for interference avoidance for in-device coexistence (Release 11)," Technical Report 36.816, Version 11.2.0, 3GPP Organizational Partners, Dec. 2011, 44 pages.
(Continued)

*Primary Examiner* — Jamal Javaid
(74) *Attorney, Agent, or Firm* — Withrow & Terranova, PLLC

(57) ABSTRACT

Methods and apparatuses for power control are disclosed for in-device coexistence (IDC). According to an embodiment, a first radio access technology (RAT) unit measures a metric indicating relative strength of traffic received by the first RAT unit with respect to IDC interference from a second RAT unit that is co-located with the first RAT unit on a user equipment (UE). The first RAT unit determines whether a condition to adjust transmission power of the second RAT unit is satisfied based at least on the measured metric. When the condition is satisfied, an adjustment indication related to a desired adjustment of the transmission power is generated based at least on the measured metric. The adjustment indication is sent to the second RAT unit.

19 Claims, 8 Drawing Sheets

(51) Int. Cl.
  *H04W 52/24* (2009.01)
  *H04W 52/36* (2009.01)
  *H04W 88/06* (2009.01)

(56) References Cited

U.S. PATENT DOCUMENTS

| | | | |
|---|---|---|---|
| 9,232,443 B2 | 1/2016 | Fu et al. | |
| 2002/0181415 A1* | 12/2002 | West | H04L 67/04 370/312 |
| 2006/0121928 A1* | 6/2006 | Itsuki | H04B 17/24 455/522 |
| 2008/0159182 A1* | 7/2008 | Tu | H04W 72/1215 370/278 |
| 2011/0053523 A1 | 3/2011 | Yeh et al. | |
| 2012/0176923 A1* | 7/2012 | Hsu | H04W 52/243 370/252 |
| 2013/0272260 A1 | 10/2013 | Bitran et al. | |
| 2013/0343288 A1 | 12/2013 | Ratasuk et al. | |
| 2015/0163752 A1 | 6/2015 | Appleton | |
| 2015/0195795 A1 | 7/2015 | Loehr et al. | |
| 2016/0249301 A1 | 8/2016 | Xiao et al. | |

OTHER PUBLICATIONS

Author Unknown, "Specifications," Bluetooth SIG, Inc., URL: "https://wwwbluetooth.com/specifications/," retrieved Jul. 21, 2020, 3 pages.
Author Unknown, "5G Access," Telefonaktiebolaget LM Ericsson, URL: "https://www.ericsson.com/en/networks/offerings/5g?gc," retrieved Jul. 21, 2020, 4 pages.
Author Unknown, "LTE; Evolved Universal Terrestrial Radio Access (E-UTRA); Radio Resource Control (RRC); Protocol specification (3GPP TS 36.331 version 11.11.0 Release 11)," ETSI Technical Specification 136 331, Version 11.11.0, European Telecommunications Standards Institute, Apr. 2015, 465 pages.
Author Unknown, "5G Spectrum: Public Policy Position," Huawei Technologies Co., Ltd., 2017, 20 pages.
Author Unknown, "Making 5G NR a reality," Qualcomm Technologies, Inc., Dec. 2016, 30 pages.
Author Unknown, "List of WLAN channels," Wikipedia, the Free Encyclopedia, URL: "https://en.wikipedia.org/wiki/List_of_WLAN_channels," retrieved Jul. 20, 2020, 10 pages.
International Search Report and Written Opinion for International Patent Application No. PCT/CN2018/080306, dated Dec. 12, 2018, 10 pages.
Extended European Search Report for European Patent Application No. 18910732.9, dated Jun. 17, 2021, 9 pages.

* cited by examiner

METHODS AND APPARATUSES FOR POWER CONTROL FOR IN-DEVICE COEXISTENCE

This application is a 35 U.S.C. § 371 national phase filing of International Application No. PCT/CN2018/080306, filed Mar. 23, 2018, the disclosure of which is incorporated herein by reference in its entirety.

TECHNICAL FIELD

Embodiments of the disclosure generally relate to wireless communication, and, more particularly, to methods and apparatuses for power control for in-device coexistence.

BACKGROUND

This section introduces aspects that may facilitate better understanding of the present disclosure. Accordingly, the statements of this section are to be read in this light and are not to be understood as admissions about what is in the prior art or what is not in the prior art.

With the increasing usage of various wireless technologies and services, more and more mobile devices or user equipments (UEs) are equipped with multiple wireless transceivers, such as long term evolution (LTE), WiFi, Bluetooth and global navigation satellite system (GNSS). In the near future, the fifth generation (5G)/new radio (NR) transceiver chips will be added. This allows for users to access various networks and services ubiquitously. However, the studies of 3rd generation partnership project (3GPP) have shown that for some specific frequency bands such as those shown in FIG. 1, concurrent operations of LTE and industrial scientific medical (ISM)/GNSS radios working in adjacent or sub-harmonic frequencies will result in significant in-device coexistence (IDC) interference that cannot be completely eliminated by filter technology. As a consequence, as shown in FIG. 2, IDC interference has become a serious issue due to the proximity of those multiple wireless transceivers.

Moreover, the ever growing mobile broadband traffic load leads to a pressing need for additional spectral resources of cellular systems, which are deployed in the spectrum mainly from 700 MHz to 2.6 GHz. On the other hand, the amount of unlicensed spectrum assigned or currently planned to be assigned is comparable to or even more than the amount of licensed spectrum. Therefore, to further expand LTE capacity to meet the traffic demands, a natural way is to integrate unlicensed carrier into the overall LTE system by adapting LTE air interface to operate in the unlicensed spectrum. Thus, LTE may operate over the same frequencies as ISM. Then, IDC interference will become even more critical.

Furthermore, IDC issues remain in the coming 5G/NR. WiFi channels cover operation frequencies of 3655-3695 MHz and 5150-5725 MHz, which may be still adjacent or sub-harmonic to 5G/NR bands.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

One of the objects of the disclosure is to provide an improved solution for power control for IDC.

According to one aspect of the disclosure, there is provided a method implemented at a UE. The method comprises measuring, at a first radio access technology (RAT) unit on the UE, a metric indicating relative strength of traffic received by the first RAT unit with respect to IDC interference from a second RAT unit that is co-located with the first RAT unit on the UE. The method further comprises determining whether a condition to adjust transmission power of the second RAT unit is satisfied based at least on the measured metric. The method further comprises, when the condition is satisfied, generating an adjustment indication related to a desired adjustment of the transmission power, based at least on the measured metric. The method further comprises sending the adjustment indication to the second RAT unit.

In an embodiment of the disclosure, the adjustment indication is sent as a universal asynchronous receiver/transmitter (UART) character through a UART interface between the first and second RAT units.

In an embodiment of the disclosure, the measuring is initiated when a message indicating that the second RAT unit starts transmission is received from the second RAT unit.

In an embodiment of the disclosure, the metric is an instantaneous metric or an average metric over a predetermined time period.

In an embodiment of the disclosure, the metric is signal to interference plus noise ratio (SINR).

In an embodiment of the disclosure, determining whether the condition is satisfied comprises determining a target value for the metric based on quality of service (QoS) of the received traffic. Determining whether the condition is satisfied further comprises determining a difference between the measured metric and the target value. Determining whether the condition is satisfied further comprises determining that the condition is satisfied when one of the following occurs: the difference is not zero; and the difference is negative.

In an embodiment of the disclosure, the target value is determined to be one of: static as a predefined value; semi-static depending on the service type of the received traffic; and dynamic depending on the current service of the received traffic.

In an embodiment of the disclosure, the generated adjustment indication comprises a direction value representing a sign of the difference and indicating a change of the transmission power.

In an embodiment of the disclosure, the generated adjustment indication further comprises at least one of: an absolute value of the difference, the QoS of the received traffic, and an identifier of the second RAT unit.

In an embodiment of the disclosure, there are more than one second RAT units on the UE, and an adjustment indication is sent to each of the more than one second RAT units.

In an embodiment of the disclosure, the first RAT is LTE or NR, and the second RAT is WiFi or Bluetooth. Alternatively, the first RAT is WiFi or Bluetooth, and the second RAT is LTE or NR.

According to another aspect of the disclosure, there is provided a method implemented at a UE. The method comprises receiving, at a second RAT unit on the UE, an adjustment indication from a first RAT unit that is co-located with the second RAT unit on the UE. The method further comprises adjusting transmission power of the second RAT unit based on the adjustment indication. The adjustment indication is generated based at least on a metric measured by the first RAT unit. The metric indicates relative strength of traffic received by the first RAT unit with respect to IDC interference from the second RAT unit.

In an embodiment of the disclosure, the adjustment indication comprises a direction value representing a sign of a difference between the measured metric and a target value based on QoS of the received traffic. Adjusting the transmission power comprises, when the direction value represents a negative sign, decreasing the transmission power by a predefined adjusting step.

In an embodiment of the disclosure, adjusting the transmission power comprises, when the direction value represents a positive sign, increasing the transmission power by the predefined adjusting step.

In an embodiment of the disclosure, the adjustment indication comprises a direction value representing a sign of a difference between the measured metric and a target value based on QoS of the received traffic, and an absolute value of the difference. Adjusting the transmission power comprises determining an adjusting step based on the absolute value. Adjusting the transmission power further comprises, when the direction value represents a negative sign, decreasing the transmission power by the adjusting step.

In an embodiment of the disclosure, adjusting the transmission power comprises, when the direction value represents a positive sign, increasing the transmission power by the adjusting step.

In an embodiment of the disclosure, the method further comprises increasing the transmission power one or more times until a new adjustment indication is received from the first RAT unit. The transmission power is decreased based on the received new adjustment indication.

In an embodiment of the disclosure, the adjustment indication further comprises the QoS of the received traffic. The method further comprises determining whether to adjust the transmission power based on the QoS of the received traffic and QoS of traffic transmitted by the second RAT unit. The adjusting is performed when determining to adjust the transmission power.

According to another aspect of the disclosure, there is provided a UE. The UE comprises at least one processor and at least one memory. The at least one memory contains instructions executable by the at least one processor, whereby the UE is operative to measure, at a first RAT unit on the UE, a metric indicating relative strength of traffic received by the first RAT unit with respect to IDC interference from a second RAT unit that is co-located with the first RAT unit on the UE. The UE is further operative to determine whether a condition to adjust transmission power of the second RAT unit is satisfied based at least on the measured metric. The UE is further operative to, when the condition is satisfied, generate an adjustment indication related to a desired adjustment of the transmission power, based at least on the measured metric. The UE is further operative to send the adjustment indication to the second RAT unit.

In an embodiment of the disclosure, the UE is operative to perform the method according to the above aspect.

According to another aspect of the disclosure, there is provided an apparatus of a UE. The apparatus comprises measurement means for measuring a metric indicating relative strength of traffic received by the apparatus with respect to IDC interference from a RAT unit that is co-located with the apparatus on the UE. The apparatus further comprises determination means for determining whether a condition to adjust transmission power of the RAT unit is satisfied based at least on the measured metric. The apparatus further comprises generation means for, when the condition is satisfied, generating an adjustment indication related to a desired adjustment of the transmission power, based at least on the measured metric. The apparatus further comprises sending means for sending the adjustment indication to the RAT unit.

In an embodiment of the disclosure, the determination means comprises means for determining a target value for the metric based on QoS of the received traffic. The determination means further comprises means for determining a difference between the measured metric and the target value. The determination means further comprises means for determining that the condition is satisfied when one of the following occurs: the difference is not zero; and the difference is negative.

According to another aspect of the disclosure, there is provided a UE. The UE comprises at least one processor and at least one memory. The at least one memory contains instructions executable by the at least one processor, whereby the UE is operative to receive, at a second RAT unit on the UE, an adjustment indication from a first RAT unit that is co-located with the second RAT unit on the UE. The UE is further operative to adjust transmission power of the second RAT unit based on the adjustment indication. The adjustment indication is generated based at least on a metric measured by the first RAT unit. The metric indicates relative strength of traffic received by the first RAT unit with respect to IDC interference from the second RAT unit.

In an embodiment of the disclosure, the UE is operative to perform the method according to the above aspect.

According to another aspect of the disclosure, there is provided an apparatus of a UE. The apparatus comprises reception means for receiving an adjustment indication from a RAT unit that is co-located with the apparatus on the UE. The apparatus further comprises adjustment means for adjusting transmission power of the apparatus based on the adjustment indication. The adjustment indication is generated based at least on a metric measured by the RAT unit. The metric indicates relative strength of traffic received by the RAT unit with respect to IDC interference from the apparatus.

In an embodiment of the disclosure, the adjustment indication comprises a direction value representing a sign of a difference between the measured metric and a target value based on QoS of the received traffic. The adjustment means comprises means for, when the direction value represents a negative sign, decreasing the transmission power by a predefined adjusting step.

In an embodiment of the disclosure, the adjustment indication comprises a direction value representing a sign of a difference between the measured metric and a target value based on QoS of the received traffic, and an absolute value of the difference. The adjustment means comprises means for determining an adjusting step based on the absolute value. The adjustment means further comprises means for, when the direction value represents a negative sign, decreasing the transmission power by the adjusting step.

According to another aspect of the disclosure, there is provided a computer program product. The computer program product comprises instructions which when executed by at least one processor, cause the at least one processor to perform the method according to the above aspect.

According to another aspect of the disclosure, there is provided a computer readable storage medium. The computer readable storage medium comprises instructions which when executed by at least one processor, cause the at least one processor to perform the method according to the above aspect.

BRIEF DESCRIPTION OF THE DRAWINGS

These and other objects, features and advantages of the disclosure will become apparent from the following detailed description of illustrative embodiments thereof, which are to be read in connection with the accompanying drawings.

DETAILED DESCRIPTION

For the purpose of explanation, details are set forth in the following description in order to provide a thorough understanding of the embodiments disclosed. It is apparent, however, to those skilled in the art that the embodiments may be implemented without these specific details or with an equivalent arrangement.

When LTE/NR and other connectivity technologies (e.g., WiFi, Bluetooth, or the like) do not coordinate, if IDC interferences are strong, then the receiving SINR at both sides may become low. Downlink throughput may significantly deteriorate or even link connection cannot be maintained. To resolve the IDC issues, some existing solution implemented at eNodeB side coordinates LTE/NR and connectivity activities by frequency division multiplexing (FDM). Although this solution can remove the root cause from technical perspective, it is very costly. Since operators must buy additional bands to preserve for UE with IDC issues, this solution presently does not draw much attention from network vendors.

Figure 1:
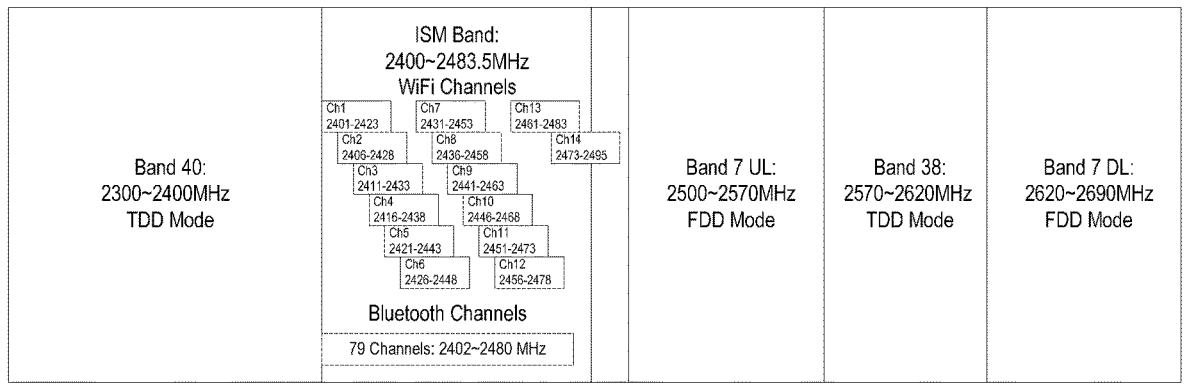
FIG. 1 shows band allocation for LTE and other connectivity technologies.
Figure 2:
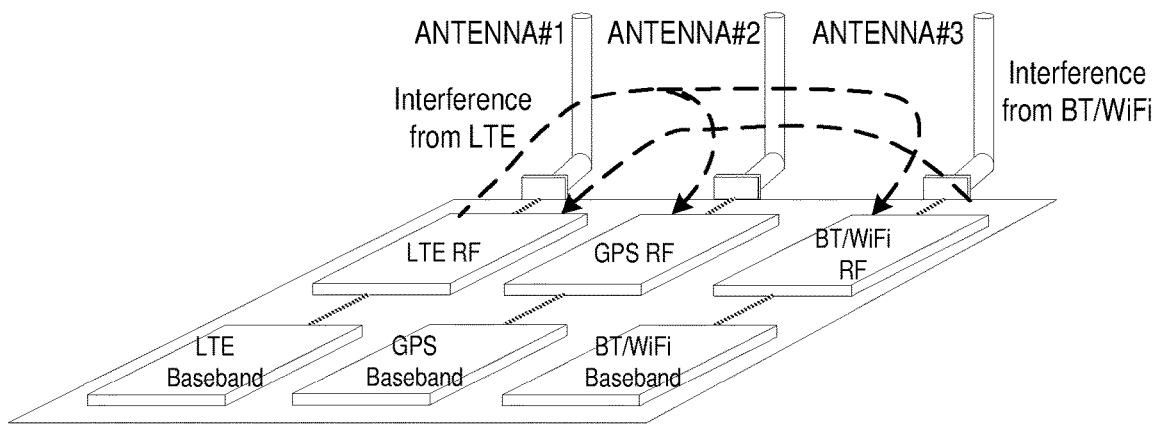
FIG. 2 is a diagram showing an example for IDC interference.
Figure 3:
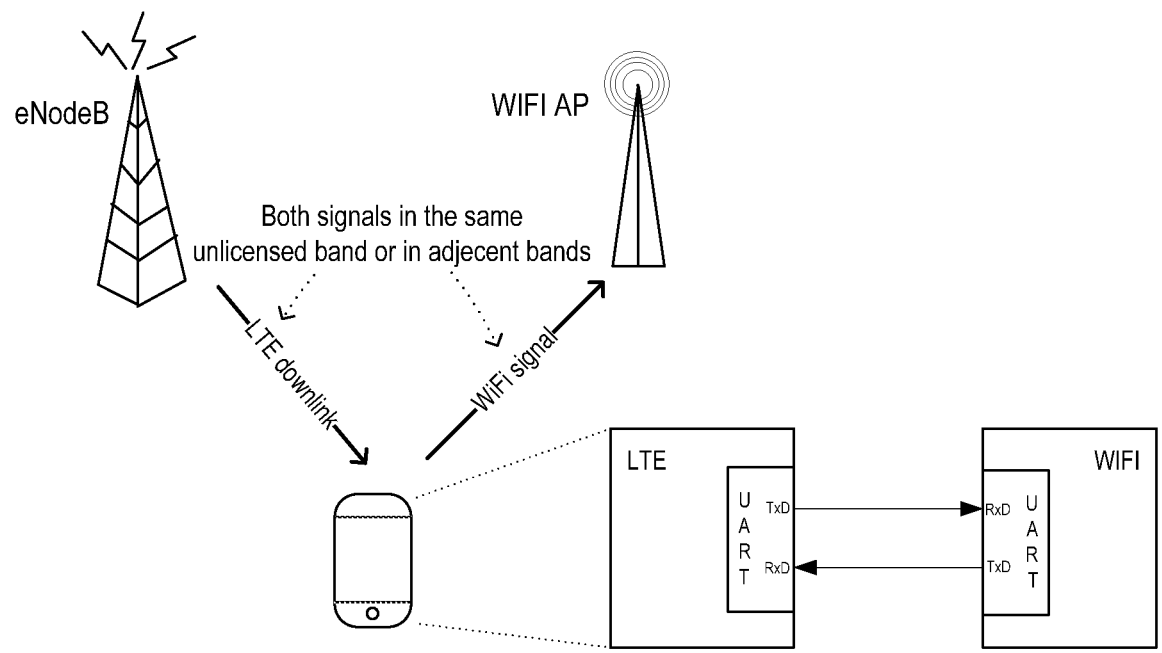
FIG. 3 is a diagram showing a UART interface for IDC.
Figure 4:
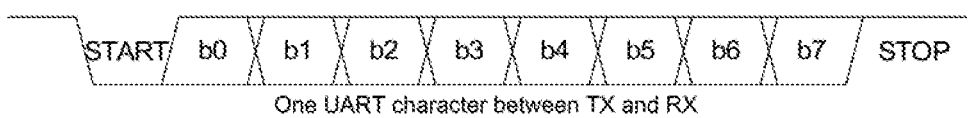
FIG. 4 is a diagram showing the structure of a UART character.

Some existing solution implemented at chip side aligns LTE/NR and connectivity activities by time division multiplexing (TDM). It employs universal asynchronous receiver/transmitter (UART) interface as signaling mechanism to indicate each other of downlink (DL) and uplink (UL). As shown in FIG. 3, two pairs of TxD and RxD are in UART interface between LTE and WiFi modems for transmission and reception of UART characters, respectively. "Tx" refers to transmission, "Rx" refers to reception, and the letter "D" in "TxD" and "RxD" refers to data. Further, as shown in FIG. 4, each UART character is composed of 10 bits. The first and last bits are used by hardware to detect a UART character. The 8 bits in-between are payload. Such characters can be exchanged between LTE and connectivity modems.

The three bits, b0, b1 and b2 define the message type. Thus, there are 8 different message types. The remaining 5 bits are the effective payload. In this existing chip-side solution, several messages have been defined, such as indications to notify the other party of DL and UL ongoing or not, as shown in Table 1 below.

TABLE 1

| Examples for signaling to indicate Tx and Rx | | | | | | | |
|---|---|---|---|---|---|---|---|
| Direction | b0 | b1 | b2 | b3 | b4 | b5 | b6 | b7 |
| LTE-> CNV | 0 | 0 | 0 | | LTE_Rx | LTE_Tx | | |
| CNV-> LTE | 0 | 0 | 0 | | BT_Tx | | 802_Tx | |

The term "CNV" in Table 1 refers to other connectivity technologies (e.g., WiFi, Bluetooth, or the like), and "BT" refers to Bluetooth. When LTE_Rx is equal to 1, LTE starts DL reception. When LTE_Tx is equal to 1, LTE starts transmission. When BT_Tx is equal to 1, BT starts transmission. When 802_Tx is equal to 1, WiFi starts transmission.

Upon reception of those indications, the corresponding party shall react accordingly to align the interference and potential Rx victim in time. Specifically, the IDC issues can be avoided by two means. One is to stop or to abort WiFi or LTE transmissions, when the other party has high-prioritized reception. This may reduce UL throughput at both sides, when low power transmission is allowed. The other means is to let WiFi transmit only at LTE discontinuous reception (DRX) gaps. This may result in that when LTE consistently receives data, WiFi almost has no opportunity for transmission. Thus, this solution makes a hard decision for IDC interference. That is, either there is IDC interference and then UL is suppressed, or there is no IDC interference and then UL is allowed.

The present disclosure proposes improved solutions for power control for IDC. Hereinafter, the solutions will be described in detail with reference to FIGS. 5-15.

Figure 5:
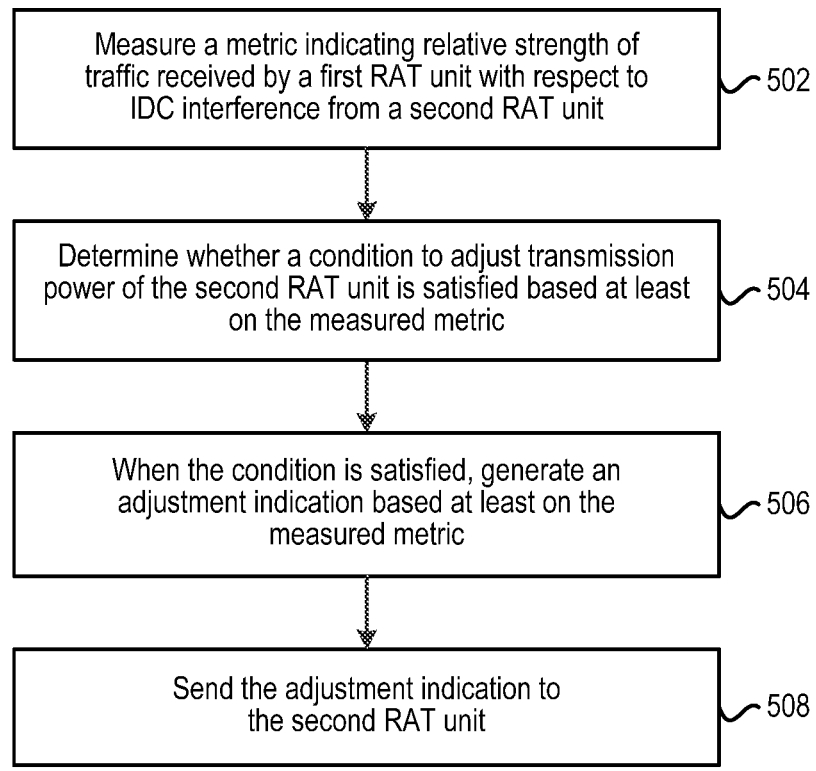
FIG. 5 is a flowchart illustrating a method implemented at a first RAT unit according to an embodiment of the disclosure.
Figure 6:
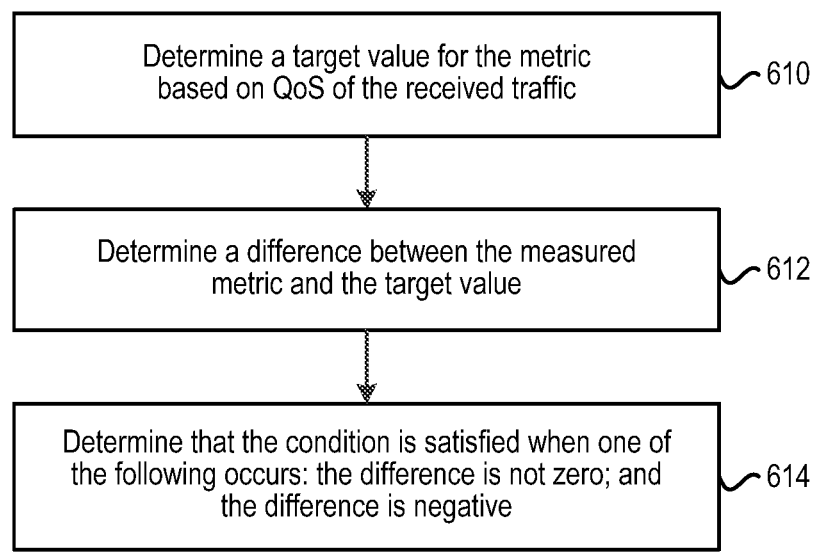
FIG. 6 is a flowchart for explaining the method of FIG. 5.

FIG. 5 is a flowchart illustrating a method implemented at a first RAT unit according to an embodiment of the disclosure. The first RAT unit is co-located with a second RAT unit on a UE. The UE may also be referred to as, for example, a mobile station, mobile unit, subscriber station, access terminal, terminal device, or the like. It may refer to any end device that can access a wireless communication network and receive services therefrom. By way of example and not limitation, the UE may include portable computers, image capture terminal devices such as digital cameras, gaming terminal devices, music storage and playback appliances, a mobile phone, a cellular phone, a smart phone, a tablet, a wearable device, a personal digital assistant (PDA), or the like.

In an Internet of things (IoT) scenario, a UE may represent a machine or other device that performs monitoring and/or measurements, and transmits the results of such monitoring and/or measurements to another UE and/or a network equipment. In this case, the UE may be a machineto-machine (M2M) device, which may, in a 3GPP context, be referred to as a machine-type communication (MTC) device. Particular examples of such machines or devices may include sensors, metering devices such as power meters, industrial machinery, bikes, vehicles, or home or personal appliances, e.g. refrigerators, televisions, personal wearables such as watches, and so on.

As a first example, the first RAT unit may be an LTE unit or an NR unit, and the second RAT unit may be a connectivity unit such as a WiFi unit or a Bluetooth unit. As a second example, the first RAT unit may be a connectivity unit such as a WiFi unit or a Bluetooth unit, and the second RAT unit may be an LTE unit or an NR unit. There may be more than one first or second RAT units on the UE. The term "RAT unit" may refer to a modem/baseband chip (or circuit).

At block 502, the first RAT unit measures a metric indicating relative strength of traffic received by the first RAT unit with respect to IDC interference from the second RAT unit. That is, the metric is measured by the first RAT unit in reception status and can reflect the relative strength between the received signal and the leakage power caused by transmission performed by the second RAT unit. Thus, the measurement of the metric may be initiated when a message indicating that the second RAT unit starts transmission is received from the second RAT unit. The metric may be an instantaneous metric or an average metric over a predetermined time period. As an exemplary example, the metric may be SINR. Alternatively, any other suitable metric such as block error rate (BLER) may also be used instead.

At block 504, the first RAT unit determines whether a condition to adjust transmission power of the second RAT unit is satisfied based at least on the measured metric. This determination may be performed based further on QoS of the received traffic. For example, block 504 may be implemented as blocks 610-614 of FIG. 6. At block 610, a target value for the metric is determined based on the QoS of the received traffic. For example, the target value may be a value capable of ensuring the QoS of the received traffic. The target value may be determined to be static as a predefined value, or semi-static depending on the service type of the received traffic, or dynamic depending on the current service of the received traffic. At block 612, a difference between the measured metric and the target value is determined. That is, the difference equals the measured metric minus the target value.

At block 614, the first RAT unit determines that the condition is satisfied when one of the following events occurs: the difference is negative; and the difference is not zero. The first event that the difference is negative indicates a strong IDC interference, which means power back-off should be taken by the second RAT unit. The second event that the difference is not zero covers two cases. The first case where the difference is negative corresponds to the first event. The second case where the difference is positive indicates a weak IDC interference, which means no power back-off is required and a power boost may be taken by the second RAT unit.

When the condition is satisfied, an adjustment indication related to a desired adjustment of the transmission power is generated based at least on the measured metric at block 506. For example, the generated adjustment indication may comprise a direction value representing a sign of the difference and indicating a change of the transmission power. As described above, an increase of the transmission power is indicated when the sign is a positive sign and a decrease of the transmission power is indicated when the sign is a negative sign. Thus, the direction value indicates the direction of the desired adjustment. Optionally, the generated adjustment indication may further comprise at least one of an absolute value of the difference, the QoS of the received traffic and an identifier of the second RAT unit. In case the sign is a negative sign, the absolute value of the difference may reflect the IDC impairment to the first RAT unit and thus is related to the magnitude of the desired adjustment. The QoS of the received traffic may be used by the second RAT unit to determine whether to adjust the transmission power, which will be described later. The identifier may be used by a specific second RAT unit to determine whether it is the destination of an adjustment indication when there are multiple second RAT units.

Each of the above parameters in the adjustment indication or a combination thereof may be expressed as a binary value. For example, the direction value may take the value of 1 when the sign of the difference is a positive sign and take the value of 0 when the sign of the difference is a negative sign. The absolute value of the difference may be quantized as a corresponding binary value when it falls within one of a plurality of value ranges. Different combinations composed of at least two of the above parameters may be mapped to different binary values.

At block 508, the adjustment indication is sent to the second RAT unit. If there are more than one second RAT units on the UE, an adjustment indication may be sent to each of the more than one second RAT units. For example, the adjustment indication may be sent as a UART character through a UART interface between the first and second RAT units. In this way, the UART interface used between LTE and other connectivity technologies may be reused between NR and other connectivity technologies.

Figure 7:
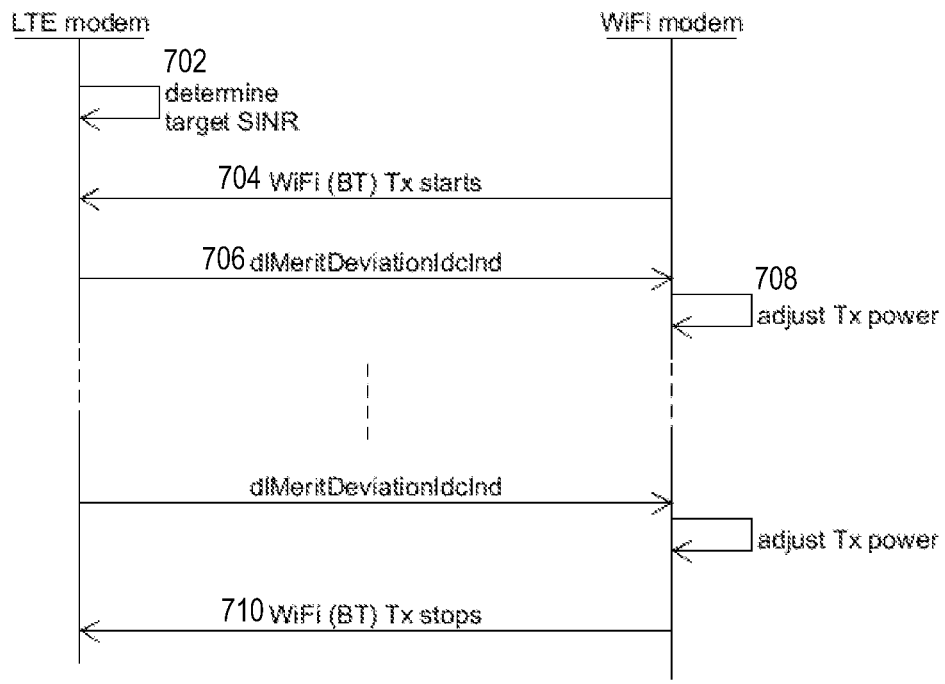
FIG. 7 is a flowchart illustrating an exemplary process according to an embodiment of the disclosure.

FIG. 7 is a flowchart illustrating an exemplary process according to an embodiment of the disclosure. In this exemplary example, the UE is an LTE UE, the first RAT unit is an LTE modem, and the second RAT unit is a WiFi/BT modem. There is a UART interface between the LTE modem and the WiFi/BT modem. The metric is historical average SINR measured over DL band. At block 702, the LTE modem determines a target DL SINR (denoted by targetSinr) to guarantee acceptable service quality. At block 704, the LTE modem receives a first UART character from the WiFi/BT modem. The bit "b6" in the first UART character is set as 1 to indicate that the WiFi/BT modem starts transmission.

Suppose the LTE UE is in RRC connected state. In response to the first UART character, the LTE modem maintains the average SINR (denoted by averageCurrentSinr) over a period. Then, at the end of each period, the following parameters may be derived:

tempDeviation=averageCurrentSinr−targetSinr, deviationDirection=(sign(tempDeviation)+1)/2, meritDeviation=abs(tempDeviation), where tempDeviation corresponds to the difference determined at block 612, sign(x) refers to a function which takes the value of 1 when x is positive and takes the value of −1 when x is negative, deviationDirection corresponds to the direction value determined at block 506, and meritDeviation corresponds to the absolute value determined at block 506. Note that meritDeviation is quantized as a binary value so as to be expressed in the bits "b3-b7" of a UART character.

Suppose tempDeviation is not zero, which means the condition to adjust the transmission power of the WiFi/BT modem is satisfied. Then, an adjustment indication (denoted by dlMeritDeviationIdcInd) is generated. An exemplary example for the adjustment indication may be given as below.

```
-- ASN1START
dlMeritDeviationIdcInd ::= SEQUENCE {
  adjustingDevice     ENUMERATED {WIFI, BT}
  qosLevel            ENUMERATED {qos0, qos1, qos2}
  deviationDirection  BOOLEAN
  meritDeviation      ENUMERATED {md0, md1, md2, . . ., md7}
}
-- ASN1STOP
```

The explanation for the above parameters may be given as below.

| dlMeritDeviationIdcInd descriptions |
|---|
| adjustingDevice<br>to identify which connectivity chip (WiFi or BT) shall adjust Tx power according to the present indication.<br>qosLevel<br>to indicate the service type to balance the qualities of services at both sides.<br>deviationDirection<br>the direction of the difference between the current merit and target one, as (sign(currentMerit − targetMerit) + 1)/2.<br>meritDeviation<br>the magnitude of the difference between the current merit and target one, as abs(currentMerit − targetMerit). Both sides may use a constant predefined step. Thus, it is optional. |

As described above, besides the messages and signals defined in the above existing chip side solution, there are reserved bits for specific extension. Thus, the adjustment indication defined above may be expressed by some or all of the 5 bits "b3-b7" to fit for the predefined format of UART characters.

At block 706, the LTE modem sends the adjustment indication as a second UART character via the UART interface to the WiFi/BT modem. If only WiFi is transmitting, the adjustingDevice may be set to WIFI. If only BT is transmitting, the adjustingDevice may be set to BT. If WiFi and BT are both transmitting, two adjustment indications may be consecutively sent, where the adjustingDevice in one indication is WIFI and the adjustingDevice in the other one is BT.

At block 708, the WiFi/BT modem adjusts the transmission power, which will be described in detail later. At block 710, the LTE modem receives a third UART character from the WiFi/BT modem. The bit "b6" in the third UART character is set as 0 to indicate that the WiFi/BT modem stops transmission. In response to the third UART character, the LTE modem may stop measuring the SINR.

Figure 8:
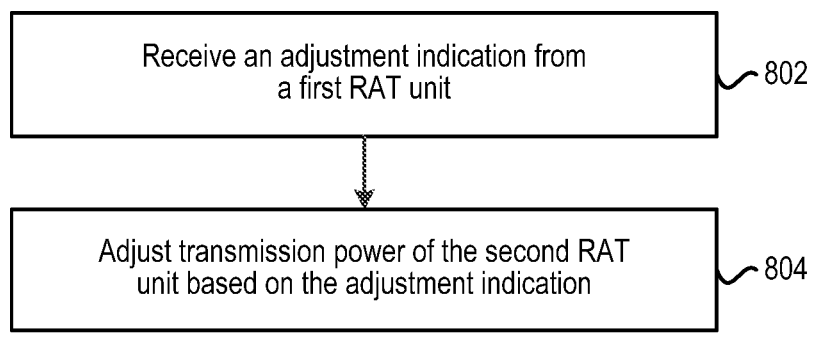
FIG. 8 is a flowchart illustrating a method implemented at a second RAT unit according to an embodiment of the disclosure.
Figure 9:
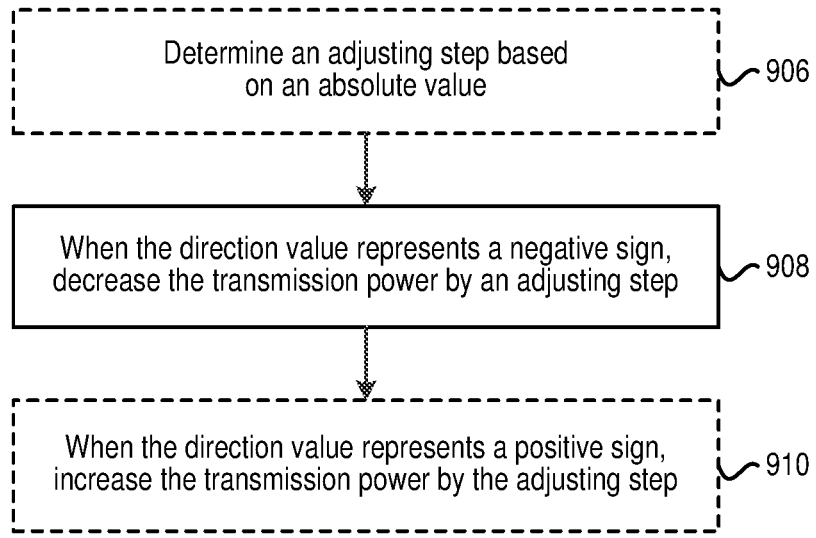
FIG. 9 is a flowchart for explaining the method of FIG. 8.

FIG. 8 is a flowchart illustrating a method implemented at a second RAT unit according to an embodiment of the disclosure. Similar to FIG. 5, the second RAT unit is co-located with a first RAT unit on a UE. At block 802, an adjustment indication is received from the first RAT unit. The adjustment indication may be generated based at least on a metric measured by the first RAT unit. The metric indicates relative strength of traffic received by the first RAT unit with respect to IDC interference from the second RAT unit. The generation and transmission/reception of the adjustment indication has been described hereinbefore and thus its detailed description is omitted here.

At block 804, transmission power of the second RAT unit is adjusted based on the adjustment indication. As a first option, the adjustment indication comprises a direction value representing a sign of a difference between the measured metric and a target value based on the QoS of the received traffic. For this option, block 804 may be implemented as block 908 and optionally block 910. At block 908, if the direction value represents a negative sign, the transmission power is decreased by a predefined adjusting step. In the case where the first RAT unit is a WiFi or Bluetooth unit and the second RAT unit is an LTE unit, various existing technologies may be used to lower the LTE transmission power, for example, by violating LTE UE capabilities, power headroom reporting, or the like.

In this way, a soft-decision making can be done to evaluate the strength of the IDC interference with respect to the real-time reception (e.g., DL) quality, such that when the interference is relatively small, transmission (e.g., UL transmission) with constrained power can still be allowed. This can greatly improve the system throughput for both reception (e.g., DL) and transmission (e.g., UL) when compared with the hard decision making in the above existing solution.

Optionally, at block 910, if the direction value represents a positive sign, the transmission power is increased by the predefined adjusting step. In this way, it is possible to improve the transmission quality of the second RAT unit without impacting the reception quality of the first RAT unit.

As a second option, the adjustment indication comprises the direction value representing the sign of the difference and an absolute value of the difference. For this option, block 804 may be implemented as blocks 906-908 and optionally block 910. At block 906, an adjusting step is determined based on the absolute value. For example, as the absolute value increases, the adjusting step may increase monotonically. The relation between the adjusting step and the absolute value may be linear or non-linear. Optionally, the configuration for the adjusting step and thus the power control may be vendor-specific. At block 908, if the direction value represents a negative sign, the transmission power is decreased by the determined adjusting step. Optionally, at block 910, if the direction value represents a positive sign, the transmission power is increased by the determined adjusting step.

Figure 10:
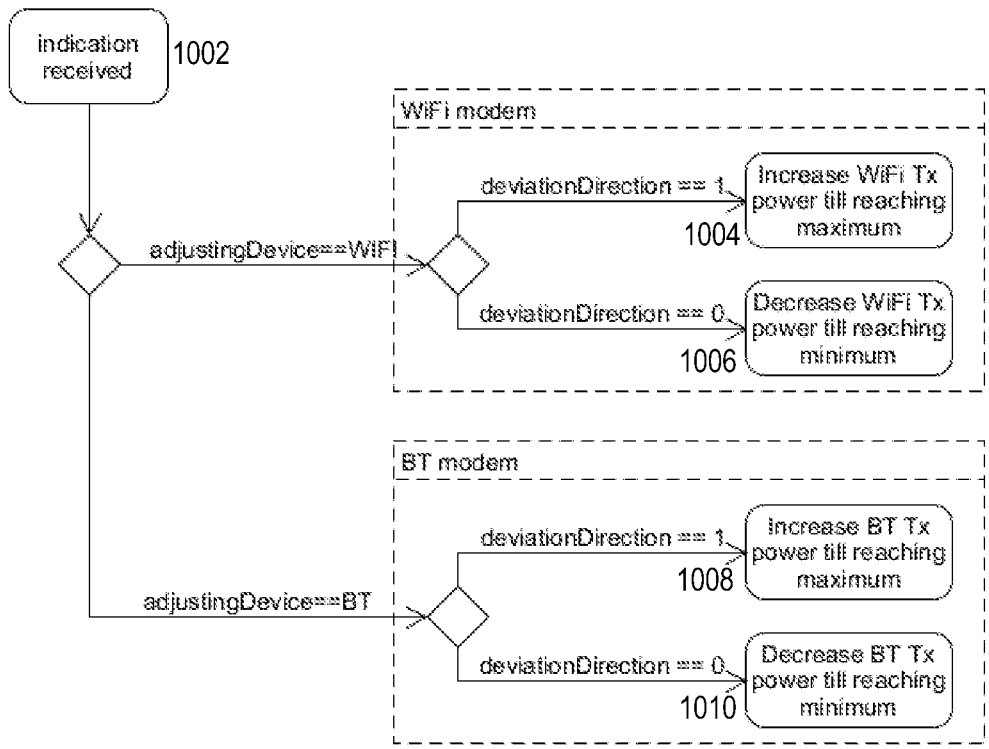
FIG. 10 is a flowchart illustrating an exemplary process according to an embodiment of the disclosure.

FIG. 10 is a flowchart illustrating an exemplary process according to an embodiment of the disclosure. This process may be used to implement block 708 of FIG. 7. At block 1002, the adjustment indication (dlMeritDeviationIdcInd) is received. Suppose the adjustment indication comprises deviationDirection and meritDeviation. Then, the deviation at the LTE modem may be determined as below:

$$lteDlMeritDeviation = (2 * deviationDirection - 1) * meritDeviation$$

$$= \text{sign}(tempDeviation) * \text{abs}(tempDeviation).$$

As described above, the adjusting step may be determined by the above deviation.

At block 1004, if the adjustingDevice is WiFi and the deviationDirection is 1, the WiFi transmission power is increased by the adjusting step. Note that if the sum of the current transmission power and the adjusting step is greater than the maximum transmission power, the transmission power after block 1004 is performed will be the maximum transmission power. At block 1006, if the adjustingDevice is WiFi and the deviationDirection is 0, the WiFi transmission power is decreased by the adjusting step. Note that if the difference between the current transmission power and the adjusting step is smaller than the minimum transmission power, the transmission power after block 1004 is performed will be the minimum transmission power. The minimum transmission power may be determined based on the QoS of the service at the WiFi modem.

Similarly, at block 1008, if the adjustingDevice is BT and the deviationDirection is 1, the BT transmission power is increased by the adjusting step. At block 1010, if the adjustingDevice is BT and the deviationDirection is 0, the BT transmission power is decreased by the adjusting step. It is also possible that the adjusting step for the WiFi modem and the adjusting step for the BT modem may be different with each other.

Figure 11:
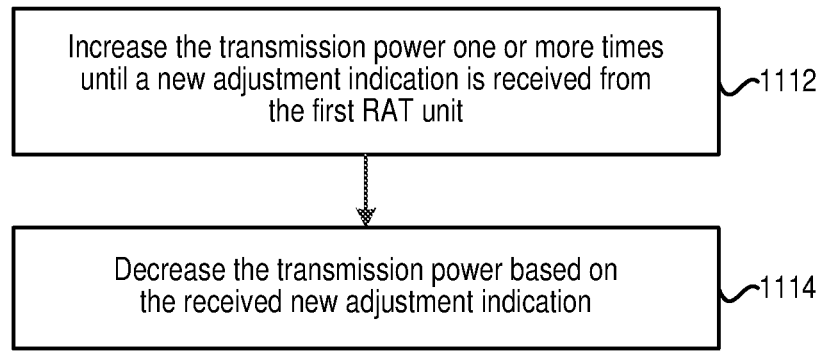
FIG. 11 is a flowchart illustrating a method implemented at a second RAT unit according to another embodiment of the disclosure.

FIG. 11 is a flowchart illustrating a method implemented at a second RAT unit according to another embodiment of the disclosure. The method shown in FIG. 11 is proposed in consideration of the above method flow in which the condition is determined to be satisfied when the difference is negative at block 614, and correspondingly, block 908 is performed and block 910 will not be performed. Such method flow cannot identify the case that when the second RAT (e.g., WiFi or BT) unit is transmitting, they do not impact the reception at the first RAT unit (e.g., LTE DL). Thus, there is a need for the second RAT unit to find opportunities to increase its transmission power.

At block 1112, the transmission power is increased one or more times until a new adjustment indication is received from the first RAT unit. The increasing step for block 1112 may be a predefined step. The reception of the new adjustment indication means the reception quality at the first RAT unit deteriorates. Thus, as described above with respect to block 506, the new adjustment indication will indicate a decrease of the transmission power. At block 1114, the transmission power is decreased based on the received new adjustment indication. Block 1114 may be implemented in a way similar to block 908. For example, the decreasing step may be the predefined step or a step determined based on the absolute value included in the new adjustment indication. Optionally, blocks 1112-1114 may be performed infrequently, especially when the reception at the first RAT unit (e.g., LTE DL) has bad quality.

Figure 12:
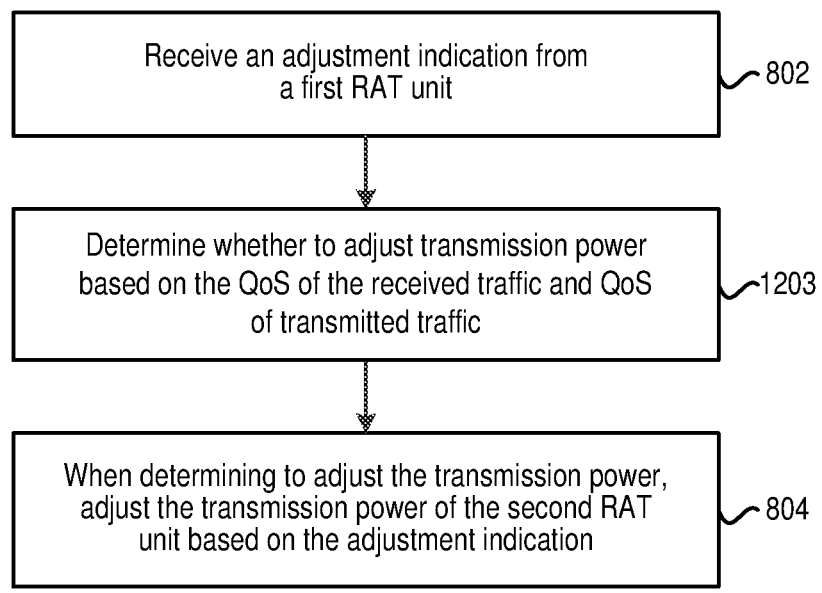
FIG. 12 is a flowchart illustrating a method implemented at a second RAT unit according to another embodiment of the disclosure.

FIG. 12 is a flowchart illustrating a method implemented at a second RAT unit according to another embodiment of the disclosure. The difference between the methods of FIG. 12 and FIG. 8 lies in that the method of FIG. 12 further comprises block 1203. At this block, the second RAT unit determines whether to adjust the transmission power based on the QoS of the received traffic and QoS of traffic transmitted by the second RAT unit. As an example, if the QoS level of the received traffic is higher than the QoS level of the transmitted traffic, the second RAT unit may determine to adjust the transmission power. On the other hand, if the QoS level of the received traffic is lower than the QoS level of the transmitted traffic, the second RAT unit may determine not to adjust the transmission power. Accordingly, block 804 is performed only when determining to adjust the transmission power at block 1203.

Figure 13:
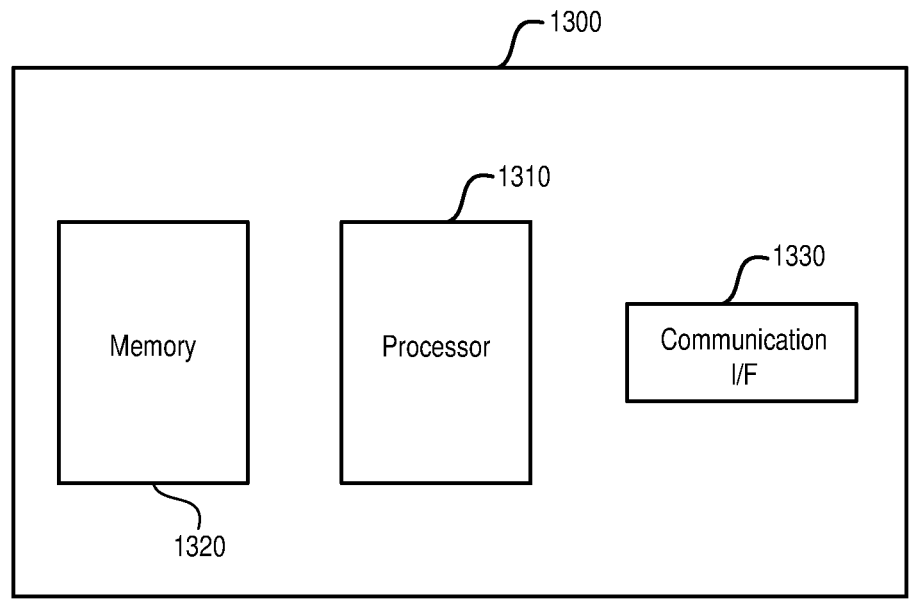
FIG. 13 is a block diagram showing an apparatus suitable for use in practicing some embodiments of the disclosure.

FIG. 13 is a block diagram showing an apparatus suitable for use in practicing some embodiments of the disclosure. For example, the apparatus 1300 may be a user equipment, and the functions described above with respect to any one of the first and second RAT units may be implemented through the apparatus 1300. As shown, the apparatus 1300 may include a processor 1310, a memory 1320 that stores a program, and a communication interface 1330 for communicating data with other external devices through wired and/or wireless communication. Note that there may be more than one processors 1310 and more than one memories 1320 in the apparatus 1300.

The program includes program instructions that, when executed by the processor 1310, enable the apparatus 1300 to operate in accordance with the embodiments of the present disclosure, as discussed above. That is, the embodiments of the present disclosure may be implemented at least in part by computer software executable by the processor 1310, or by hardware, or by a combination of software and hardware.

The memory 1320 may be of any type suitable to the local technical environment and may be implemented using any suitable data storage technology, such as semiconductor based memory devices, flash memory, magnetic memory devices and systems, optical memory devices and systems, fixed memory and removable memory. The processor 1310 may be of any type suitable to the local technical environment, and may include one or more of general purpose computers, special purpose computers, microprocessors, digital signal processors (DSPs) and processors based on multi-core processor architectures, as non-limiting examples.

Figure 14:
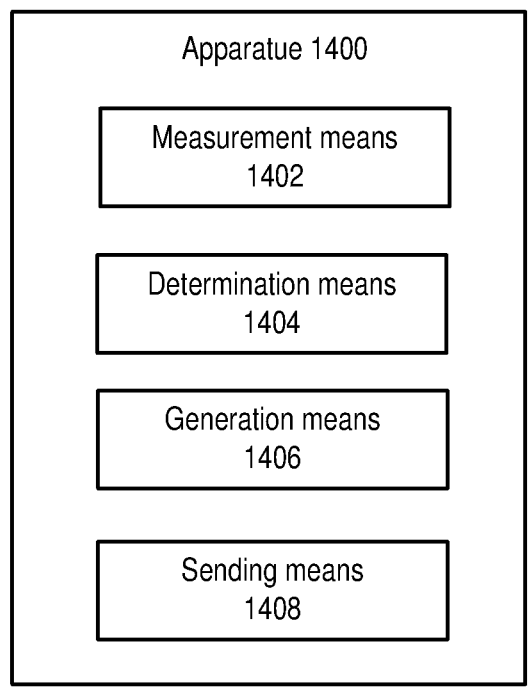
FIG. 14 is a block diagram showing an apparatus according to an embodiment of the disclosure.

FIG. 14 is a block diagram showing an apparatus according to an embodiment of the disclosure, which is implemented as at least part of a UE. The functions described above with respect to the first RAT unit may be implemented through the apparatus 1400. As shown, the apparatus 1400 comprises measurement means 1402, determination means 1404, generation means 1406 and sending means 1408. The measurement means 1402 may be configured to measure a metric indicating relative strength of traffic received by the apparatus with respect to IDC interference from a RAT unit that is co-located with the apparatus on the UE, as described above with respect to block 502. The determination means 1404 may be configured to determine whether a condition to adjust transmission power of the RAT unit is satisfied based at least on the measured metric, as described above with respect to block 504. The generation means 1406 may be configured to, when the condition is satisfied, generate an adjustment indication related to a desired adjustment of the transmission power, based at least on the measured metric, as described above with respect to block 506. The sending means 1408 may be configured to send the adjustment indication to the RAT unit, as described above with respect to block 508. For example, the means 1402-1408 described above may be implemented as hardware (such as integrated circuits, field programmable gate arrays (FPGA), or the like), software, or a combination thereof.

As an option, the determination means 1404 may comprise means for determining a target value for the metric based on QoS of the received traffic, means for determining a difference between the measured metric and the target value, and means for determining that the condition is satisfied when one of the following occurs: the difference is not zero; and the difference is negative.

Figure 15:
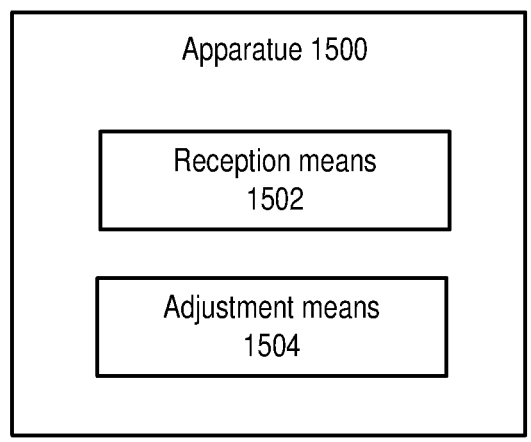
FIG. 15 is a block diagram showing an apparatus according to another embodiment of the disclosure.

FIG. 15 is a block diagram showing an apparatus according to another embodiment of the disclosure, which is implemented as at least part of a UE. The functions described above with respect to the second RAT unit may be implemented through the apparatus 1500. As shown, the apparatus 1500 comprises reception means 1502 and an adjustment means 1504. The reception means 1502 may be configured to receive an adjustment indication from a RAT unit that is co-located with the apparatus on the UE, as described above with respect to block 802. The adjustment means 1504 may be configured to adjust transmission power of the apparatus based on the adjustment indication, as described above with respect to block 804. The adjustment indication is generated based at least on a metric measured by the RAT unit. The metric indicates relative strength of traffic received by the RAT unit with respect to IDC interference from the apparatus. For example, the means 1502-1504 described above may be implemented as hardware (such as integrated circuits, field programmable gate arrays (FPGA), or the like), software, or a combination thereof.

As an option, the adjustment indication comprises a direction value representing a sign of a difference between the measured metric and a target value based on QoS of the received traffic. The adjustment means 1504 may comprise means for, when the direction value represents a negative sign, decreasing the transmission power by a predefined adjusting step.

In the above option, the adjustment means 1504 may further comprise means for, when the direction value represents a positive sign, increasing the transmission power by the predefined adjusting step. Alternatively, the adjustment means 1504 may further comprise means for increasing the transmission power one or more times until a new adjustment indication is received from the first RAT unit. The transmission power may be decreased based on the received new adjustment indication.

As another option, the adjustment indication comprises a direction value representing a sign of a difference between the measured metric and a target value based on QoS of the received traffic, and an absolute value of the difference. The adjustment means 1504 may comprise means for determining an adjusting step based on the absolute value, and means for, when the direction value represents a negative sign, decreasing the transmission power by the adjusting step.

In the above option, the adjustment means 1504 may further comprise means for, when the direction value represents a positive sign, increasing the transmission power by the adjusting step. Alternatively, the adjustment means 1504 may further comprise means for increasing the transmission power one or more times until a new adjustment indication is received from the first RAT unit. The transmission power may be decreased based on the received new adjustment indication.

As still another option, the adjustment indication further comprises the QoS of the received traffic. The apparatus 1500 may further comprises determination means configured to determine whether to adjust the transmission power based on the QoS of the received traffic and QoS of traffic transmitted by the RAT unit. The adjustment means 1504 may be configured to operate when the determination means determines to adjust the transmission power.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one of skill in the art, the function of the program modules may be combined or distributed as desired in various embodiments. In addition, the function may be embodied in whole or in part in firmware or hardware equivalents such as integrated circuits, field programmable gate arrays (FPGA), and the like.

References in the present disclosure to "one embodiment", "an embodiment" and so on, indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described. It should be noted that two blocks shown in succession in the flowcharts may, in fact, be executed substantially concurrently, or the blocks may sometimes be executed in the reverse order, depending upon the functionality involved.

It should be understood that, although the terms "first", "second" and so on may be used herein to describe various elements, these elements should not be limited by these terms. These terms are only used to distinguish one element from another. For example, a first element could be termed a second element, and similarly, a second element could be termed a first element, without departing from the scope of the disclosure. As used herein, the term "and/or" includes any and all combinations of one or more of the associated listed terms.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components, but do not preclude the presence or addition of one or more other features, elements, components and/or combinations thereof. The terms "connect", "connects", "connecting" and/or "connected" used herein cover the direct and/or indirect connection between two elements.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-Limiting and exemplary embodiments of this disclosure.

What is claimed is:

1. A method implemented at a user equipment (UE), the method comprising:
    measuring, at a first radio access technology (RAT) unit on the UE, a metric indicating relative strength of traffic received by the first RAT unit with respect to in-device coexistence (IDC) interference from a second RAT unit that is co-located with the first RAT unit on the UE;
    determining whether a condition to adjust transmission power of the second RAT unit is satisfied based at least on the measured metric;
    when the condition is satisfied, generating an adjustment indication related to a desired adjustment of the transmission power, based at least on the measured metric; and
    sending the adjustment indication to the second RAT unit.

2. The method according to claim 1, wherein the adjustment indication is sent as a universal asynchronous receiver/transmitter (UART) character through a UART interface between the first and second RAT units.

3. The method according to claim 1, wherein the measuring is initiated when a message indicating that the second RAT unit starts transmission is received from the second RAT unit.

4. The method according to claim 1, wherein the metric is an instantaneous metric or an average metric over a predetermined time period.

5. The method according to claim 1, wherein the metric is signal to interference plus noise ratio (SINR).

6. The method according to claim 1, wherein determining whether the condition is satisfied comprises:
    determining a target value for the metric based on quality of service (QoS) of the received traffic;
    determining a difference between the measured metric and the target value; and
    determining that the condition is satisfied when one of the following occurs: the difference is not zero; and the difference is negative.

7. The method according to claim 6, wherein the target value is determined to be one of:
    static as a predefined value;
    semi-static depending on the service type of the received traffic; and
    dynamic depending on the current service of the received traffic.

8. The method according to claim 6, wherein the generated adjustment indication comprises:
    a direction value representing a sign of the difference and indicating a change of the transmission power.

9. The method according to claim 8, wherein the generated adjustment indication further comprises at least one of:
    an absolute value of the difference;
    the QoS of the received traffic; and
    an identifier of the second RAT unit.

10. The method according to claim 1, wherein there are more than one second RAT units on the UE, and an adjustment indication is sent to each of the more than one second RAT units.

11. The method according to claim 1, wherein the first RAT is long term evolution (LTE) or new radio (NR), and the second RAT is WiFi or Bluetooth; or wherein the first RAT is WiFi or Bluetooth, and the second RAT is LTE or NR.

12. A method implemented at a user equipment (UE), the method comprising:
    receiving, at a second radio access technology (RAT) unit on the UE, an adjustment indication from a first RAT unit that is co-located with the second RAT unit on the UE; and
    adjusting transmission power of the second RAT unit based on the adjustment indication;
    wherein the adjustment indication is generated based at least on a metric measured by the first RAT unit, the metric indicating relative strength of traffic received by the first RAT unit with respect to in-device coexistence (IDC) interference from the second RAT unit.

13. The method according to claim 12, wherein the adjustment indication comprises: a direction value representing a sign of a difference between the measured metric and a target value based on quality of service (QoS) of the received traffic; and
    wherein adjusting the transmission power comprises:
        when the direction value represents a negative sign, decreasing the transmission power by a predefined adjusting step.

14. The method according to claim 13, wherein adjusting the transmission power comprises:
    when the direction value represents a positive sign, increasing the transmission power by the predefined adjusting step.

15. The method according to claim 12, wherein the adjustment indication comprises: a direction value representing a sign of a difference between the measured metric and a target value based on [[QoS]] a Quality of Service (QoS) of the received traffic; and
    an absolute value of the difference; and
    wherein adjusting the transmission power comprises:
        determining an adjusting step based on the absolute value; and
        when the direction value represents a negative sign, decreasing the transmission power by the adjusting step.

16. The method according to claim 15, wherein adjusting the transmission power comprises:
    when the direction value represents a positive sign, increasing the transmission power by the adjusting step.

17. The method according to claim 13, further comprising: increasing the transmission power one or more times until a new adjustment indication is received from the first RAT unit; and
    wherein the transmission power is decreased based on the received new adjustment indication.

18. The method according to claim 12, wherein the adjustment indication further comprises a Quality of Service (QoS) of the received traffic;
    wherein the method further comprises: determining whether to adjust the transmission power based on the QoS of the received traffic and QoS of traffic transmitted by the second RAT unit; and wherein the adjusting is performed when determining to adjust the transmission power.

19. A user equipment (UE) comprising:
at least one processor; and
at least one memory, the at least one memory containing instructions executable by the at least one processor, whereby the UE is operative to:
   measure, at a first radio access technology (RAT) unit on the UE, a metric indicating relative strength of traffic received by the first RAT unit with respect to in-device coexistence (IDC) interference from a second RAT unit that is co-located with the first RAT unit on the UE;
   determine whether a condition to adjust transmission power of the second RAT unit is satisfied based at least on the measured metric;
   when the condition is satisfied, generate an adjustment indication related to a desired adjustment of the transmission power, based at least on the measured metric; and
   send the adjustment indication to the second RAT unit.

* * * * *